US011884592B2

(12) United States Patent
Kocaba et al.

(10) Patent No.: US 11,884,592 B2
(45) Date of Patent: Jan. 30, 2024

(54) HYDRAULIC COMPOSITION FOR GROUT

(71) Applicant: CHRYSO, Issy les Moulineaux (FR)

(72) Inventors: Vanessa Kocaba, Creteil (FR); Sandra Darguy, Toulouse (FR)

(73) Assignee: CHRYSO, Issy les Moulineaux (FR)

( * ) Notice: Subject to any disclaimer, the term of this patent is extended or adjusted under 35 U.S.C. 154(b) by 1021 days.

(21) Appl. No.: 16/489,191

(22) PCT Filed: Feb. 28, 2018

(86) PCT No.: PCT/EP2018/054899
§ 371 (c)(1),
(2) Date: Aug. 27, 2019

(87) PCT Pub. No.: WO2018/158299
PCT Pub. Date: Sep. 7, 2018

(65) Prior Publication Data

US 2019/0375684 A1 Dec. 12, 2019

(30) Foreign Application Priority Data

Feb. 28, 2017 (FR) ....................................... 1751614

(51) Int. Cl.

| | |
|---|---|
| ***C04B 24/38*** | (2006.01) |
| ***C04B 24/12*** | (2006.01) |
| ***C04B 28/02*** | (2006.01) |
| ***C04B 40/00*** | (2006.01) |
| ***C04B 40/06*** | (2006.01) |
| ***E21D 11/06*** | (2006.01) |
| *C04B 103/12* | (2006.01) |
| *C04B 103/22* | (2006.01) |
| *C04B 111/70* | (2006.01) |

(52) U.S. Cl.
CPC .............. *C04B 24/38* (2013.01); *C04B 24/12* (2013.01); *C04B 24/386* (2013.01); *C04B 28/02* (2013.01); *C04B 40/0039* (2013.01); *C04B 40/0658* (2013.01); *E21D 11/06* (2013.01); *C04B 2103/12* (2013.01); *C04B 2103/22* (2013.01); *C04B 2111/70* (2013.01)

(58) Field of Classification Search
CPC .. C04B 7/34; C04B 7/00; C04B 28/00; C04B 32/00; C04B 16/00; C04B 24/00; C04B 24/10; C04B 24/38; C04B 24/12; C04B 24/386; C04B 28/02; C04B 40/0039; C04B 40/0658; C04B 2103/12; C04B 2103/22; C04B 2111/70
USPC ................................. 106/638, 802, 804, 805
See application file for complete search history.

(56) References Cited

U.S. PATENT DOCUMENTS

| | | | | |
|---|---|---|---|---|
| 2015/0005414 A1 | 1/2015 | Guise et al. | | |
| 2015/0027346 A1* | 1/2015 | Osborne, Jr. | ........... C04B 28/02 | 106/708 |

FOREIGN PATENT DOCUMENTS

| | | | | |
|---|---|---|---|---|
| DE | 102004039107 A1 | 6/2005 | | |
| EP | 0755992 A1 | 1/1997 | | |
| EP | 1004557 A1 * | 5/2000 | ............. C04B 24/38 | |
| EP | 1004557 A1 | 5/2000 | | |
| JP | 2002-160955 A | 6/2002 | | |
| JP | 3704394 B2 | 10/2005 | | |
| WO | WO 2011/161384 A1 | 12/2011 | | |

OTHER PUBLICATIONS

Thewes, M. et al. "Mortel im Tunnelbau Stand der Technik und aktuelle Entwicklungen zur VerfUllung des Ringspaltes bei Tunnelvortriebsmaschinen" BauPortal Dec. 2009, Dec. 31, 2009 (Dec. 31, 2009), pp. 706-711, XP055198529, Retrieved from the World-Wide-Web at: BauPortal-digital.de/BAUPD.12.2009.706, retrieved on Jun. 4, 2015.
International Search Report, dated Feb. 28, 2017, in International Application No. PCT/EP2018/054899, (in 5 pages).
Preliminary Search Report in corresponding French Application No. FR 1751614, dated Nov. 9, 2017, (in 1 page).

* cited by examiner

*Primary Examiner* — James E Mcdonough
(74) *Attorney, Agent, or Firm* — Knobbe Martens Olson & Bear LLP

(57) ABSTRACT

A hydraulic composition including water; a hydraulic binder; at least one setting retarder; and at least one polysaccharide; the weight ratio of the water/hydraulic binder being greater than 1.5, methods of using the composition as a mixture in a grout and a corresponding method for preparing a grout and the grout thereby obtained.

12 Claims, No Drawings

HYDRAULIC COMPOSITION FOR GROUT

FIELD

The present invention relates to a hydraulic composition, preferably a mortar composition, in particular for grouts, a process for its manufacture, its use for the preparation of grouts as well as the mortars thus obtained.

BACKGROUND

The construction of tunnels using tunnel boring machines involves, after the excavation of the soil and the evacuation of the boring cuttings, securing the space so created by placing voussoirs (supporting segments) against the walls and fixing the position of the voussoirs by filling the annular space formed between the wall and the voussoirs. Depending on the technical constraints and the properties of the soil, the filling of the annular void may be effected with gravel (inert filling) or with mortar (cohesive filling). In order to avoid misalignment of the voussoirs through sagging, the material is injected only a few seconds after positioning the voussoirs, for example via pipes set back from the tunnel boring machine.

The construction of the tunnel also requires the use of a sealant, in particular, a tail sealant to prevent the penetration of water, of the mortar, and in order to improve the service life of the wire brushes of the tunnel boring machine, etc. It is necessary to have good compatibility between the sealant and the grout. In particular, the mortar must not rise in cracks that may exist in the sealant.

International application WO 2009/068380 discloses a hydraulic mortar for backfilling tunnels comprising a polysaccharide and a water reducing agent. These mortars, formulated as a single component, however, do not always meet the stringent requirements in terms of fluid retention time, made necessary when the site is located remotely from the plant in which the mortar is formulated or when maintenance operations require work at the worksite to be stopped for several days.

SUMMARY

The grout must meet very demanding specifications.

Thus, the grout must be sufficiently fluid to be able to fill the annular space perfectly. On the other hand, it is expected that the mortar should quickly develop compressive strength in order to consolidate the tunnel by stiffening the line of the voussoirs.

In order to meet these requirements, a solution in the form of a two-component mortar, also called A+B mortar has been proposed. The first component, often referred to as mixture A or grout, comprises the hydrated hydraulic binder adjuvant of a setting retarder and a stabilizer, for example a bentonite.

Once the mixture A has been brought to the site from the plant, it is mixed with a mixture B comprising a setting accelerator. Usually both components are mixed in the lines just before injection. The addition of component B ensures rapid solidification of the mortar once injected. Typically, the mortar becomes pasty after a few seconds. Nevertheless, the gel time must be carefully adjusted to allow fast stabilization of the voussoirs while avoiding setting in the pipes and their subsequent blocking.

These bicomponent grouts give overall satisfaction but may be improved in several respects.

In particular, these mortars may lack robustness, and not meet all the desired performance criteria when the constituent materials vary.

Thus, low homogeneity of the suspension may be observed in the case of some bentonites used as stabilizers of the mixture A (or grout). When the suspension is not homogeneous, the solid particles may settle, causing a film of water to appear on the surface, a phenomenon known as bleeding.

However, mixture A must be sufficiently fluid and stable to be able to be inserted into the annular space, generally by pumping. It is furthermore expected that the stability and the rheological properties will be maintained for the duration of its transport and its storage on the site, for up to 72 hours. In addition, the grout must be compatible with the tail sealant to ensure the tightness of the voussoirs.

An object of the invention is to provide a hydraulic composition, preferably a mortar composition, which may be used as a mixture A in two-component grouts, making it possible to satisfy the requirements specified for the tunnel construction by the tunnel boring machine and which also solves the problems mentioned above.

Another object of the invention is to propose solutions that are more stable over time.

Another object of the invention is to propose solutions that make it possible to overcome the variability of the clay generally used as a rheology agent.

Also, according to a first aspect, the invention provides a hydraulic composition, preferably a mortar composition, comprising:

- water;
- hydraulic binder;
- at least one setting retarder;
- at least one polysaccharide;
- the water/hydraulic binder weight ratio being greater than 1.5.

DETAILED DESCRIPTION

In the context of the present invention, "greater than x" or "less than x" is understood to mean that terminal x is not included.

In the context of the present invention, "greater than or equal to x" or "less than or equal to x" is understood to mean that limit x is included.

In the context of the present invention, "between x and y" is understood to mean that the limits x and y are included.

In the context of the present invention, polysaccharide is used as a rheology control agent. Preferably, in the context of the present invention, the polysaccharide is chosen from welan gums, diutan gums, celluloses, or their mixture. Preferably, the polysaccharide is chosen from welan gums and diutan gums, more particularly welan gums.

Preferably, the polysaccharide is chosen from polysaccharides having a d90 particle size of less than 300 μm.

Preferably, the polysaccharide is chosen from welan gums, diutan gums, celluloses or their mixture having a d90 particle size of less than 300 μm. Preferably, the polysaccharide is chosen from welan gums and diutan gums, more particularly welan gums having a d90 particle size of less than 300 μm.

d90 corresponds to the diameter of more than 90% by volume of the particles. Thus, more than 90% by volume of the particles have a diameter of less than 300 μm.

Particle size distributions of the particles are measured by any method known to those skilled in the art. They may be measured, in particular, by using a MALVERN INSTRU- MENT MASTERSIZER 2000 granulometer. In principle, the angular variation of light intensity is scattered as the laser beam passes through the sample of dispersed particles. Large particles scatter light at small angles to the laser beam from a red light source (Helium/Neon) with a wavelength of 632.8 nm and small particles scatter light at higher angles (source of blue light with a wavelength of the order of 466 nm). These data are analyzed to calculate the size of the particles that created the diffraction pattern through Mie's theory. The size of the particles is then represented by the diameter of the equivalent sphere, having the same volume as the particle. By convention, the optical properties required for the calculations are defined as follows:

Refraction index of the sample: 1.68

Sample absorption index: 0.1

Decreasing index of dispersant (air): 1.00

Preferably, the composition according to the invention comprises from 0.1 to 5 g/l by weight of polysaccharide, preferably from 0.3 to 2 g/l by weight relative to the weight of the hydraulic composition.

Advantageously, the hydraulic composition according to the invention may be used as mixture A in two-component mortars.

The term "setting retarder" is used herein to mean a compound which, when added to a hydraulic composition, has the effect of delaying its setting through hydraulic setting compared to the same hydraulic composition without such a composition. agent. This setting delay makes it possible to increase the open time of the hydraulic composition, i.e. the time during which it is always fluid and manipulable. The setting retarder makes it possible to maintain the rheological properties, especially the consistency or workability, indicated by the flow value at the Marsh cone, for a prolonged period of time.

Suitable setting retarders for compositions according to the invention, especially of the mixture A type, include, in particular, sugars and their derivatives, carboxylic or hydroxycarboxylic acids, phosphonic acids and their salts, and phosphates.

Among the sugars, mention may be made, in particular, of glucose and gluconates, in particular sodium gluconate.

Among the carboxylic or hydroxycarboxylic acids, those having a pKA of between 2 and 5 are preferred. Particularly preferred are acetic acid, gluconic acid, citric acid, tartaric acid, malic acid and their salts and mixtures. Citric acid and gluconic acid and their salts and mixtures are particularly preferred.

Among the phosphonic acids and their salts, amino triethylenphosphonic acid (ATMP), ethylene diamine tetra methylenephosphonic acid (EDTMP), 1-hydroxyethylidene-1,1,1-diphosphonic acid (HEDP), and their salts, especially sodium, are preferred.

Among the phosphates, sodium tripolyphosphate and tetrapotassium pyrophosphate are preferred.

Preferably, the setting retarder is chosen from phosphonates, sugars, preferably gluconates.

Among these setting retarders, sodium gluconate and EDTMP and their mixtures are particularly interesting in terms of cost/performance. The retarder content in the composition of the invention is preferably included in the conventional ranges and is adapted to the specific constraints of each site. Preferably, the setting should not occur before 72 hours after preparation of the composition according to the invention (or mixture A). For this, the setting retarder is preferably used in a proportion of 0.1 to 2% by dry weight of the weight of hydraulic binder, preferably 0.25 to 1% by dry weight of the weight of hydraulic binder.

The term "hydraulic binder" is understood to mean any compound having the property of hydrating in the presence of water and whose hydration makes it possible to obtain solids having mechanical characteristics, in particular a cement such as a Portland cement, aluminous cement, pozzolanic cement or an anhydrous or semi-hydrated calcium sulphate. The hydraulic binder may be a cement according to EN197-1 (2001) and, in particular, a Portland cement, mineral additions, especially slags, or a cement comprising mineral additions.

"Cement" is understood to mean a cement according to EN 197-1 (2001) and, in particular, a CEM I, CEM II, CEM III, CEM IV or CEM V type cement according to Cement NF EN 197-1 (2012). The cement may include mineral additions.

The term "mineral additions" refers to slags (as defined in Cement Standard NF EN 197-1 (2012) section 5.2.2), steelmaking slags, pozzolanic materials (as defined in Cement Standard NF EN 197-1 (2012) paragraph 5.2.3), fly ash (as defined in Cement Standard NF EN 197-1 (2012) section 5.2.4), calcined schists (as defined in Cement Standard NF EN 197-1 (2012) section 5.2.5), limescale (as defined in Cement Standard NF EN 197-1 (2012) section 5.2.6) or fumed silica (as defined in Cement Standard NF EN 197-1 (2012) section 5.2.7) or their mixtures. Other additions, not currently recognized by the Cement Standard NF EN 197-1 (2012), may also be used. These include, in particular, metakaolins, such as type A metakaolins conforming to standard NF P 18-513 (August 2012), and siliceous additions, such as the siliceous additions of mineralogy Qz conforming to standard NF P 18-509 (September 2012).

Preferably, the water/hydraulic binder weight ratio is greater than or equal to 1.8, preferably between 2 and 10, preferably between 2.5 and 5.

The hydraulic composition according to the invention may also comprise additives, in particular a biocide and an antifoam, preferably in an amount of 0.01 to 2% by weight relative to the total weight of the composition.

The hydraulic composition according to the invention may also comprise clays, such as sepiolite, bentonite, montmorillonite, smectite, kaolinite, chlorite, illite. Without wishing to be bound by any theory, it is assumed that the clay acts as a stabilizer of the hydraulic composition for its use as a mixture A in two-component mortars. However, particularly surprisingly, the inventors found that the addition of clay was not necessary in the hydraulic composition according to the invention. Thus, advantageously, the hydraulic composition of the invention is free of clay.

The hydraulic composition according to the invention preferably comprises 0 to 8%, and in particular 0.5 to 5% by dry weight of clay.

Preferably, the composition according to the invention is free of dispersant, in particular of dispersing polymer, such as, for example, PCP (polyalkoxylated polycarboxylate), polynaphthalene sulphonate, polymelamine sulphonate, lignosulphonate.

Another object of the present invention is a method for preparing a grout comprising the steps of:

(a) preparation of a hydraulic composition according to the invention; and (b) adding to the composition obtained in (a) a mixture B comprising a setting accelerator.

The present application also relates to the grout thus obtained or "two-component mortar".

The term "two-component mortar" refers to mortars based on hydraulic binder formulated by two components. The component called "Mixture A" has a prolonged workability and a pumping ability that allow its routing from the plant and possible storage on site. Just before insertion, the mixture A is mixed with the mixture B comprising a setting accelerator which ensures almost immediate gelation and is accompanied by a development of the compressive strength. In the context of the present invention, the mixture A is the hydraulic composition described above.

The setting accelerator ensures almost immediate solidification of the mortar as well as a rapid rise in compressive strength, thus securing the positioning of the voussoirs. Among suitable setting accelerating agents mention may be made, in particular, of conventional setting accelerators such as calcium and sodium nitrate, calcium and sodium nitrite, calcium and sodium thiocyanate, calcium and sodium formate, aluminum sulphate and sodium silicate. Among these accelerators, sodium silicate is particularly preferred.

The two-component mortar according to the invention is prepared in the usual manner from a hydraulic composition according to the invention as a mixture A and a mixture B. The formulation may also, if necessary, comprise a clay as specified above, in particular a bentonite. However, advantageously, the specific choice of the hydraulic composition according to the invention as mixture A may make it possible to dispense with the use of a clay.

Mixture B is preferably a liquid formulation comprising at least one setting accelerator in combination with possible additives, for example antifoam, biocide, etc. A mixture B in the form of an aqueous solution is particularly preferred.

Introduced in a separate step, just before injection into the annular vacuum, the mixture B is dosed in volume at 8 to 12% of the volume of hydraulic composition according to the invention (mixture A).

The preparation of the hydraulic composition according to the invention and of the mixture B and their mixing may be effected in a conventional manner.

The invention will be better understood by means of the specific examples given below.

EXAMPLES

Unless otherwise indicated, all the tests described below are carried out at 20° C. and at ambient pressure.

A. Measurement of the Flow Time at the MARSH Cone

The measurement of the flow time is measured with a standardized MARSH cone (1.5 liter capacity, 4.8 mm diameter orifice) according to the following protocol derived from ASTM C939-10 (Roussel et al., Cement and Concrete). Research, 2004):

- Close the lower flow hole of the cone with the finger
- Pour the mortar through the mesh of the safety screen up to the mark (1500 mL)
- Pour a few ml of mortar out of the receiving container to flush out the residual water and then again close the bottom hole with the finger.
- Place the capacity receptacle one liter under the orifice
- Trigger the timer when opening the orifice
- Measure the time required for the flow of a liter of mortar The result is expressed in s/L, with an intrinsic measurement uncertainty of ±0.5 s/L.

B. Penetrant Measurement

As the hydraulic composition is very diluted, it tends to settle over time despite the structuring role of the bentonite. Sedimentation is evaluated with the following protocol derived from ASTM C940-10:

- In a 200 mL plastic graduated cylinder, introduce 200 mL of mortar A to the corresponding level.
- Leave the test piece at rest on a vibration-free surface
- At the desired times (3 h, 24 h, 48 h, and 72 h), measure the level of the water supernatant by noting the associated graduation
- Calculate the degree of bleeding:

$$R \text{ bleeding}=\text{Initial level}-\text{Supernatant level}/\text{Initial level}$$

The bleeding result is expressed as a % by volume on an average between two measurements. Uncertainty may be estimated to ±1%.

C. Polysaccharides Used in the Examples

TABLE 1

| | Polysaccharide | Granulometry (* μm) d90 |
|---|---|---|
| Polysaccharide 1 | Diutan gum | 152 |
| Polysaccharide 2 | Wellan gum | 289 |
| Polysaccharide 3 | Diutan gum | 107 |
| Polysaccharide 4 | Methyl cellulose Hydroxyethyl | |

The particle size is measured as specified above.

The polysaccharide 4 has a viscosity, measured at 20° C. with a Rotovisko apparatus programmed on a shear rate of between 2 and 55 $s^{-1}$ on a 1% concentrated aqueous solution of 8600 mPa·$s^{-1}$.

D. Mixing Compositions A According to the Invention

TABLE 2

| Test | Polysaccharide | Setting retarder | Hydraulic binder Cement (type) | Quantity Cement (g) | Quantity water (g) |
|---|---|---|---|---|---|
| 1 | Polysaccharide 1 1.1 g/L of mixture A | EDTMP 2 g/L | CEM I 52,5N Xeuilley | 300 | 800 |
| 2 | Polysaccharide 2 1.2 g/L of mixture A | EDTMP 2 g/L | CEM I 52,5N Xeuilley | 300 | 800 |
| 3 | Polysaccharide 3 1 g/L of mixture A | EDTMP 2 g/L | CEM I 52,5N Xeuilley | 300 | 800 |
| 4 | Polysaccharide 4 2 g/L of mixture A | EDTMP 2.5 g/L | CEM I 52,5N Xeuilley | 300 | 800 |

Hydraulic compositions, mixture A, were prepared. These compositions were prepared with a Rayneri kneader equipped with a deflocculating blade according to the following procedure:

In a 5 liter bucket, the indicated amount of water was introduced. After stirring at a speed of 1500 rpm (fixed rate for the duration), the setting retarder was added and stirred for a further 30 seconds. Finally, the cement and the polysaccharide according to the invention were added and stirred for a further 30 seconds.

The respective formulation of the slurries is shown in Table 2 above.

E. Results

The following results are obtained for the hydraulic compositions corresponding to the tests 1 to 3 of the invention

TABLE 3

| Composition according to the invention | Marsh cone flow time(s) | | | | Penetrant penetration test (%) | | | |
|---|---|---|---|---|---|---|---|---|
| | 10 min | 24 h | 48 h | 72 h | 3 h | 24 h | 48 h | 72 h |
| Test 1 | 33 | 41 | 41 | 39 | 0 | 0 | 5 | 10 |
| Test 2 | 29 | 32 | 35 | 39 | 0 | 0 | 0 | 0 |
| Test 3 | 32 | 38 | 50 | 68 | 0 | 0 | 0 | 0 |
| Test 4 | 29 | 30 | 33 | 35 | 10 | 50 | 50 | 50 |

The results show that compositions 1, 2 and 3 according to the invention have a bleeding rate of less than 10% at 72 h and a satisfactory Marsh cone flow time. Test 4 shows that the polysaccharide 4 does not stabilize the mortar correctly and a large bleed is measured.

F. Gel Time Protocol

The gel time is the time that the mortar A+B takes to pass from a liquid state to a gel. The mixing protocol of mixture A with mixture B is as follows and is derived from Testing Procedures for Two-Component Annulus Grouts, Phil Antunes, North American Tunneling 2012 Proceedings, (Ed.: Matthew Fowler, Robert Palermo, Robert Pintabona, Michael Smithson, Jr. published by EMS, 2012) pages 14-22:

In a 1.5 liter beaker, introduce one liter of hydraulic composition (mixture A)

In a second 1.5-liter beaker, introduce the desired amount of accelerator B (of the order of 8 to 10% of the mixing volume A)

Trigger the timer and mix the two components by pouring from one beaker to another with a frequency of the order of a few seconds As soon as the mixture forms a gel that can no longer be decanted, stop the stopwatch and record the gel time.

The gel time is expressed in seconds and is usually between 10 and 30 seconds. The gel time for test 2 is 17 seconds and that for test 3 is 20 seconds.

What is claimed is:

1. A hydraulic composition comprising:

water;

a hydraulic binder;

at least one setting retarder; and at least one polysaccharide selected from the group consisting of welan gums, diutan gums, and a mixture thereof;

wherein the ratio by weight of water/hydraulic binder is greater than 2.5.

2. The hydraulic composition according to claim 1, wherein the polysaccharide is a welan gum.

3. The hydraulic composition according to claim 1 wherein the polysaccharide is a polysaccharide having a particle size d90 less than 300 μm.

4. The hydraulic composition according to claim 1 comprising from 0.1 to 5 g of polysaccharide per liter of the hydraulic composition.

5. The hydraulic composition according to claim 1, wherein the setting retarder is selected from the group consisting of sugars, sugar derivatives, carboxylic acids, hydroxycarboxylic acids, phosphonic acids, phosphonic acid salts, and phosphates.

6. A process for preparing a grout comprising the steps of:

(a) preparing a hydraulic composition according to claim 1; and (b) adding to the composition obtained in (a) a mixture B comprising a setting accelerator.

7. The process according to claim 6, wherein the setting accelerator is selected from the group consisting of calcium nitrate, sodium nitrate, calcium nitrite, sodium nitrite, calcium thiocyanate, sodium thiocyanate, calcium formate sodium formate, aluminum sulphate and sodium silicate.

8. A two-component grout comprising the hydraulic composition according to claim 1.

9. The hydraulic composition according to claim 4 comprising from 0.3 to 2 g of polysaccharide per liter of the hydraulic composition.

10. The hydraulic composition according to claim 1 wherein the water/hydraulic binder weight ratio is between 2.5 and 10.

11. The hydraulic composition according to claim 1 wherein the water/hydraulic binder weight ratio is between 2.5 and 5.

12. A hydraulic composition consisting of:

water;

a hydraulic binder;

at least one setting retarder; and at least one polysaccharide selected from the group consisting of welan gums, diutan gums, and a mixture thereof;

wherein the ratio by weight of water/hydraulic binder is greater than 2.5.

* * * * *

UNITED STATES PATENT AND TRADEMARK OFFICE

CERTIFICATE OF CORRECTION

PATENT NO. : 11,884,592 B2
APPLICATION NO. : 16/489191
DATED : January 30, 2024
INVENTOR(S) : Vanessa Kocaba et al.

It is certified that error appears in the above-identified patent and that said Letters Patent is hereby corrected as shown below:

In the Specification

In Column 3, Lines 48-49, delete “triethylenphosphonic” and insert --trimethylenephosphonic--.

In Column 7, Line 6, delete “invention” and insert --invention.--.

In the Claims

In Column 8, Claim 7, Line 27, delete “formate” and insert --formate,--.

Signed and Sealed this
Thirteenth Day of August, 2024

Katherine Kelly Vidal

Katherine Kelly Vidal
*Director of the United States Patent and Trademark Office*